Figure 1:
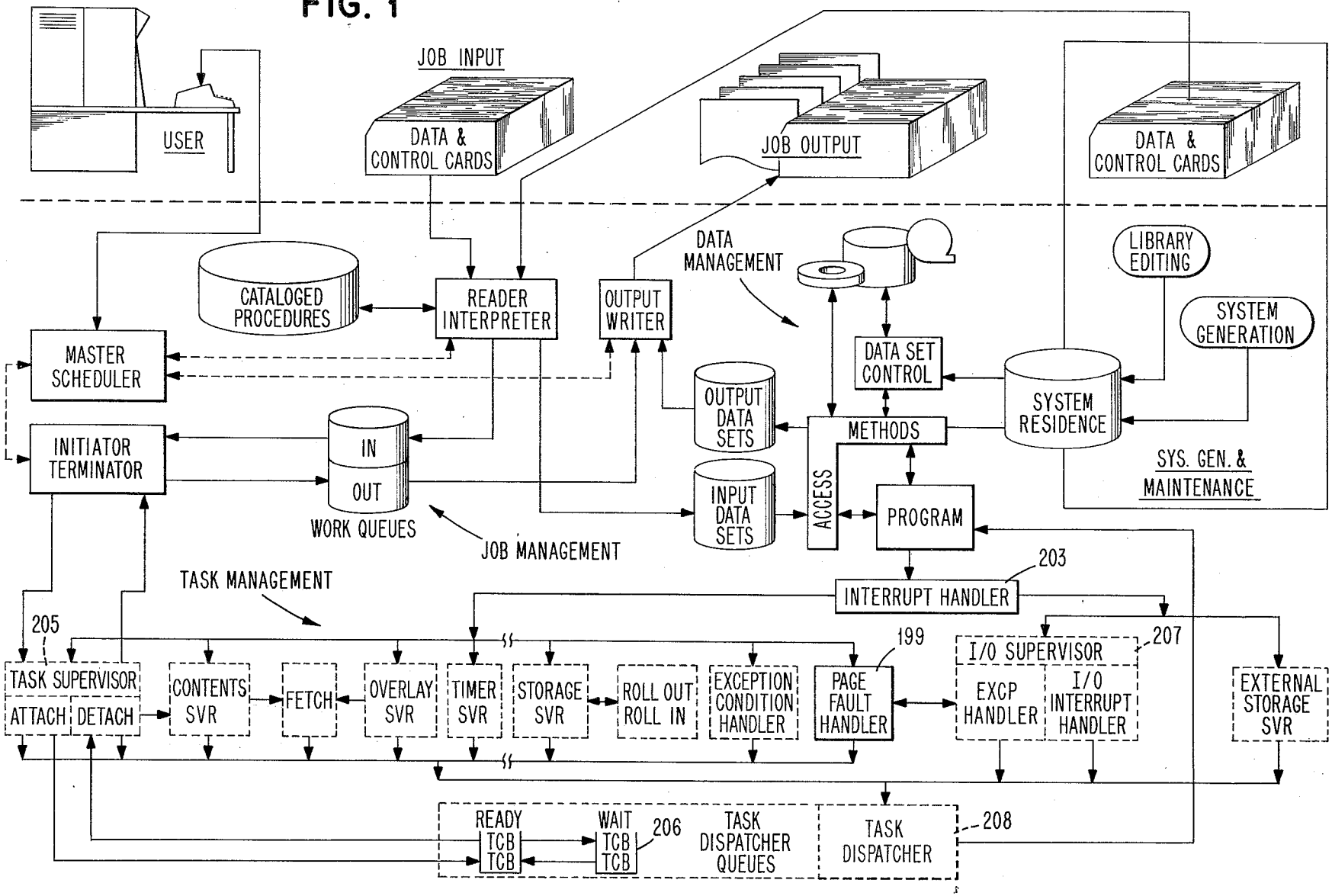
Figure 2:
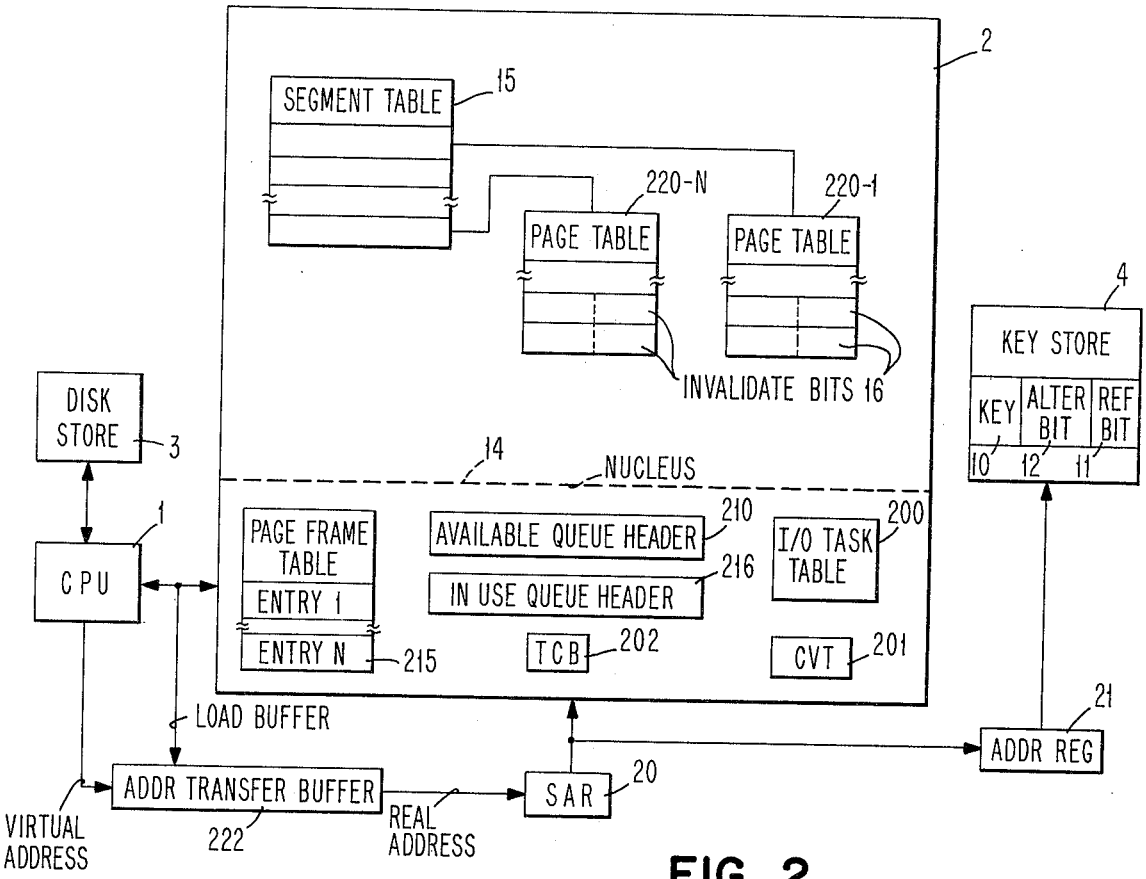
Figure 5:
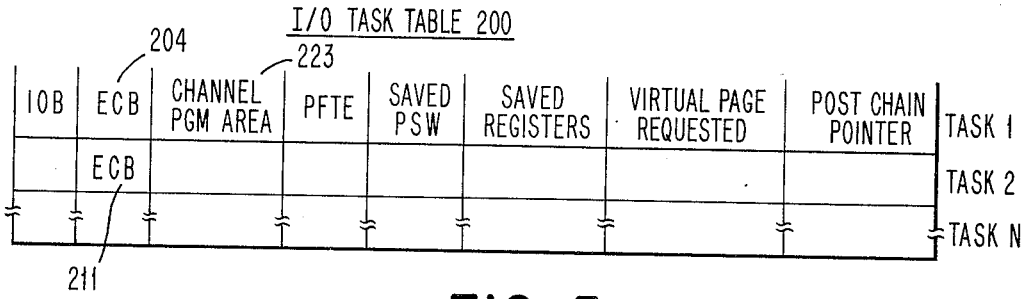
Figure 3:
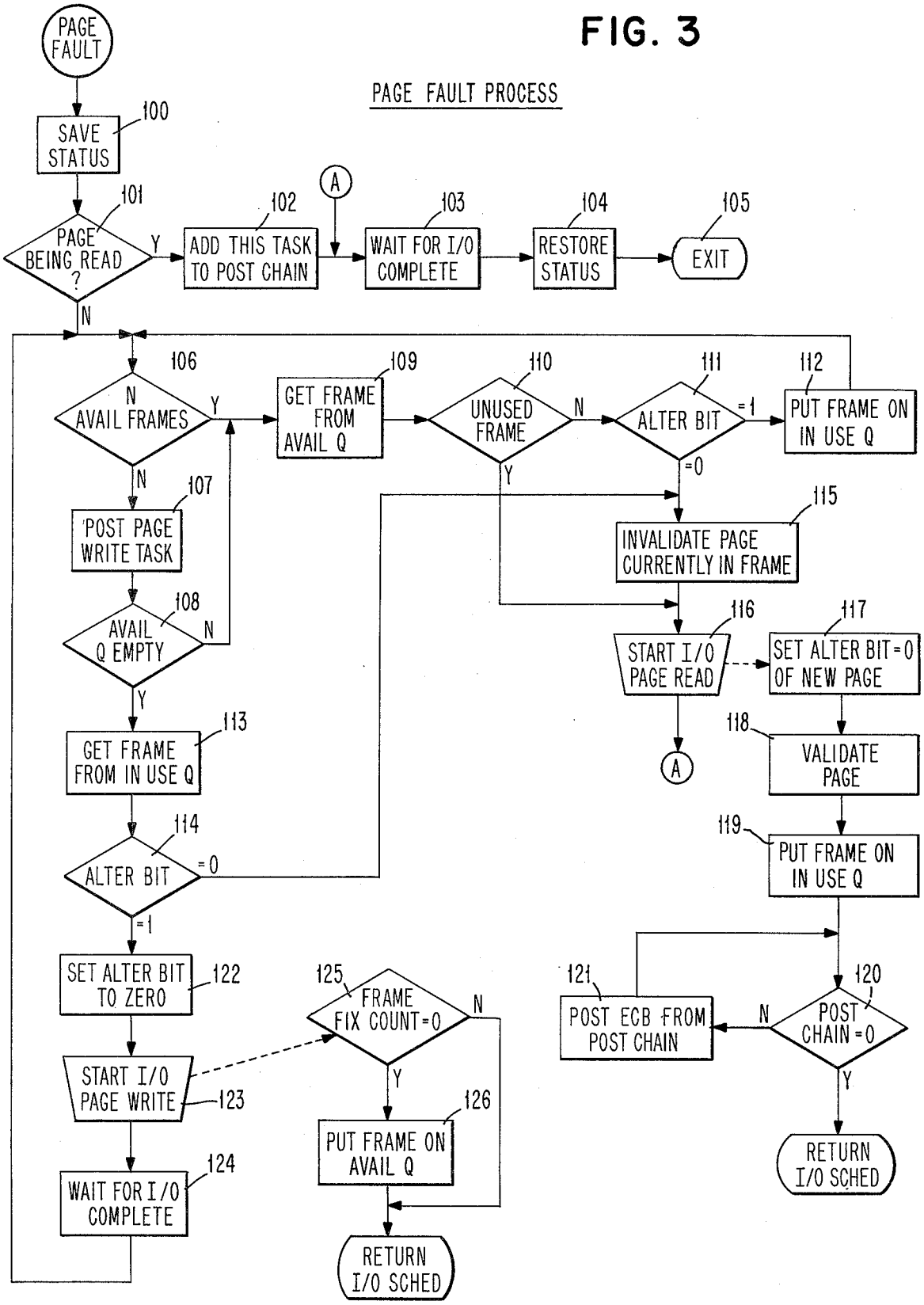
Figure 4:
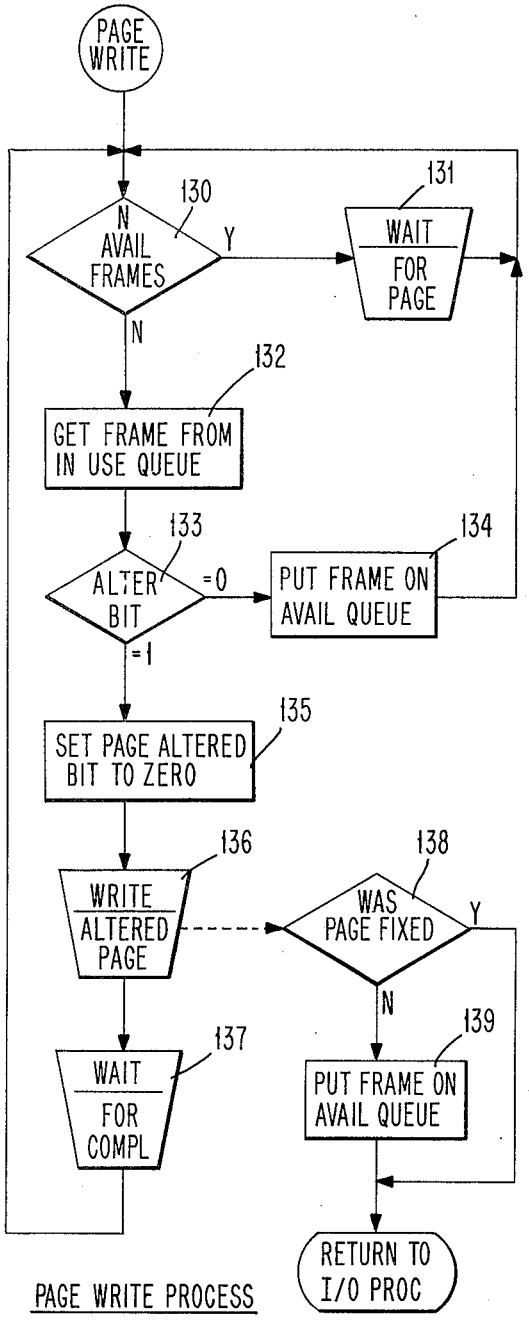
Figure 7:
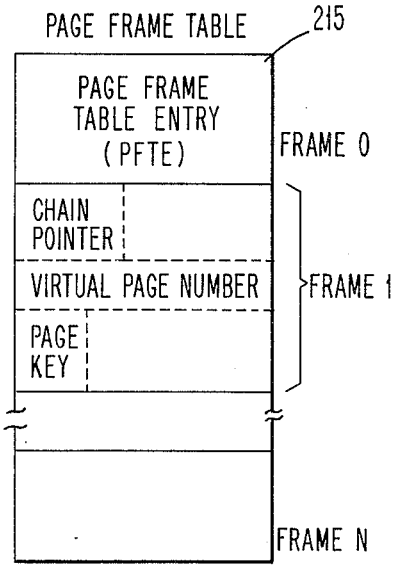
Figure 6:
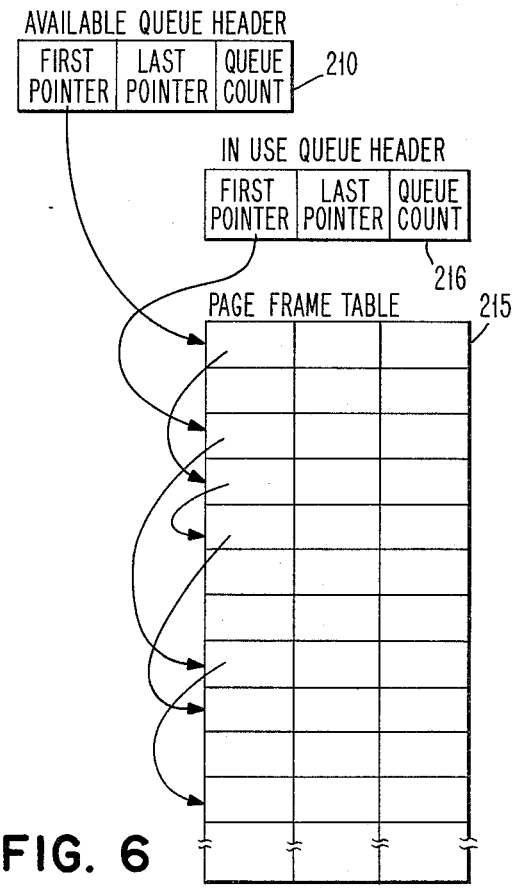

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 8

T939,004

ALGORITHM FOR PAGE RECLAMATION VIA CHANGE BIT RECORDING IN RELOCATABLE CPU ENVIRONMENTS

Warren J. Kelley, Berkshire, and Lawrence E. Larson, Vestal, N.Y., assignors to International Business Machines Corporation, Armonk, N.Y.

Continuation of abandoned application Ser. No. 274,785, July 24, 1972. This application Oct. 18, 1973, Ser. No. 407,767.

**Int. Cl. G06f *13/00***

U.S. Cl. 444—1

4 Sheets Drawing. 25 Pages Specification

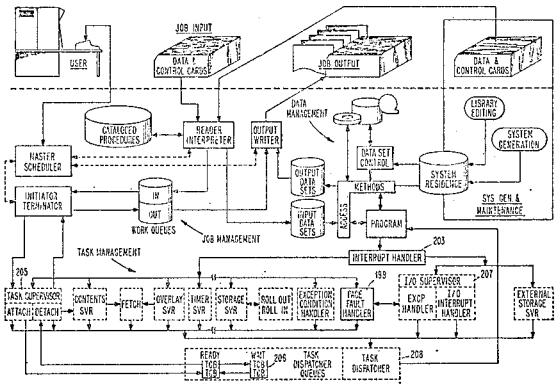

An algorithm is described which reduces system overhead and enhances system performance by recording (transfer from main store to disk) rolled-out pages in a "page valid" state, i.e. the copy of the page of data is still in main (or real) store and accessible for processing during roll-out. This method eliminates page faults (a determination that the desired page is not available for access in main store) during and after the roll-out cycle. When the recording is completed, the "change" bit (sometimes called "alter" bit) of the page is tested to insure that the recording is accurate (the copy in main store has not been altered during roll-out). If the main store copy of the rolled-out page has been altered, another page is selected for roll-out. If the recording is accurate and a new page is waiting to be rolled in, the main store copy of the rolled-out page is invalidated, and roll-in of a new page overlaying the rolled-out page is initiated. Thus, the page is held valid and available until just prior to its being overlayed with a new page of data.

ALGORITHM FOR PAGE RECLAMATION VIA CHANGE BIT RECORDING IN RELOCATABLE CPU ENVIRONMENTS

Original Filed Oct. 18, 1973